United States Patent
Schieferstein et al.

(10) Patent No.: US 6,365,234 B1
(45) Date of Patent: Apr. 2, 2002

(54) POLYMERIZABLE, CHROMIUM-FREE, ORGANIC COATINGS FOR METAL

(75) Inventors: Ludwig Schieferstein, Ratingen; Manfred Gorzinski, Duesseldorf; Stefan Kuepper, Hilden; Herbert Fischer, Duesseldorf, all of (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/554,628

(22) PCT Filed: Nov. 10, 1998

(86) PCT No.: PCT/EP98/07161

§ 371 Date: Jul. 14, 2000

§ 102(e) Date: Jul. 14, 2000

(87) PCT Pub. No.: WO99/25897

PCT Pub. Date: May 27, 1999

(30) Foreign Application Priority Data

Nov. 19, 1997 (DE) .......................................... 197 51 153

(51) Int. Cl.[7] .............................. B05D 3/02; B05D 3/06
(52) U.S. Cl. ..................... 427/487; 427/496; 427/388.1
(58) Field of Search .......................... 427/388.1, 388.2, 427/388.3, 388.4, 388.5, 487, 496

(56) References Cited

U.S. PATENT DOCUMENTS 3,671,295 A  6/1972  Ravve et al.

FOREIGN PATENT DOCUMENTS

| | | |
|---|---|---|
| CA | 1 156 000 | 10/1983 |
| DE | 29 43 566 | 5/1981 |
| EP | 0 178 020 | 4/1986 |
| EP | 0 469 034 | 2/1992 |
| EP | 0 518 609 | 12/1992 |
| EP | 0 555 383 | 8/1993 |
| EP | 0 648 822 | 4/1995 |
| GB | 2 165 165 | 4/1986 |
| WO | WO89/01952 | 3/1989 |

*Primary Examiner*—Erma Cameron
(74) *Attorney, Agent, or Firm*—Wayne C. Jaeschke; Stephen D. Harper

(57) ABSTRACT

Polymerizable compositions containing titanium, manganese and/or zirconium salts of olefinically unsaturated, polymerizable carboxylic acids and other olefinically unsaturated comonomers and a radical polymerization initiator are suitable for the organic coil coating of metallic materials. These non-aqueous metal coatings are suitable for the chromium-free pretreatment of steel with excellent corrosion control.

18 Claims, No Drawings

POLYMERIZABLE, CHROMIUM-FREE, ORGANIC COATINGS FOR METAL

FIELD OF THE INVENTION

This invention relates to polymerizable compositions for the organic coating of metallic materials, to a process for their production and to a process for the coil coating of steel.

BACKGROUND OF THE INVENTION

In the metal-processing industry, particularly in the assembly of motor vehicles and in machine construction, the metallic components of the products have to be protected against corrosion. At present, the metal plates are first coated with corrosion-inhibiting oils at the rolling mill and are optionally coated with drawing oils before forming and die-stamping. In vehicle assembly or in machine construction, the metal plates shaped for bodywork, bodywork parts or machinery are stamped out and are formed by deep drawing using the drawing oils mentioned above. This is generally followed by assembly by welding and/or flanging and/or bonding and—after complicated cleaning steps—by a corrosion-inhibiting surface pretreatment. This corrosion-inhibiting surface pretreatment consists of phosphating and, generally, chromating, after which the first coating of paint is applied to the parts in question, often by electrodeposition. This initial electrodeposition step is generally followed by the application of several other layers of paint, particularly in the case of car bodies.

Recently, so-called coil coating processes have been increasingly used for the pretreatment of steel plates because coil coating simplifies many process steps. In coil coating, steel strip is continuously pretreated and, optionally, organically coated at the rolling mill. Coil coating can save considerably on energy. In addition, it uses fewer chemicals and less fresh water and reduces the accumulation of wastewater. Nowadays, a range of steel strip surfaces, for example hot-dip-galvanized, electrolytically galvanized, galvannealed, aluminized surfaces, is available for improving the protection of the steel plates against corrosion. The steel strip thus treated is protected against corrosion immediately after production. Key standards for the quality of the vehicles or machinery produced from these steel plates are good paint adhesion and effective protection against corrosion. In conventional pretreatment processes based on coil coating, the use of chromium-containing products has hitherto been essential for increasing corrosion prevention and paint adhesion. Thus, even where such processes as alkaline passivation and the zinc or iron phosphating of steel or galvanized steel strip are used, after-passivation products containing chromic acid have to be used in order to obtain the required protection against corrosion. The wastewaters which accumulate where these processes are used have to be treated and disposed of at considerable cost. In addition, special safety measures have to be taken for handling chemicals containing chromium(VI) in the production of the pretreatment products, their transportation and their use.

A first step towards cleaner wastewater was the development of products based on chromic acid which were applied by a new process where no rinsing baths were used. This process came to be known as the no-rinse process.

Chromium-free no-rinse pretreatment processes have recently been developed on the basis of aqueous acidic solutions of fluoride-containing titanium salts and organic polymers as principal components. In addition, metal ions, such as manganese, cobalt, nickel or zinc, and phosphate and silicates may also be present. The organic constituents used are chelating polymers, such as polyacrylates or polyvinyl phenol derivatives. A key function of these chelating polymers is to form with the metal ions complexes which are stable in the aqueous phase. These chromium-free systems are described, for example, in EP 178020, in EP 469034 and in EP 555383. Although the processes just mentioned enable chromium-free systems to be used without any adverse effect on corrosion prevention, their disadvantage is that these chromium-free systems can only be applied from strongly acidic solutions and require a very high concentration of fluoride ions.

Accordingly, there is a need to develop pretreatment chemicals and pretreatment processes for chromium-free pretreatment which enable effective corrosion control to be obtained without having to use strong acids or high fluoride concentrations. The various constituents should preferably be uniformly distributed throughout the composition in order to avoid separation during production, transportation, storage and use.

SUMMARY OF THE INVENTION

The solution provided by the present invention is defined in the claims and essentially comprises providing polymerizable compositions for the organic coating of metallic materials which contain at least one titanium, manganese and/or zirconium salt of an olefinically unsaturated polymerizable carboxylic acid, at least one other olefinically unsaturated comonomer and at least one radical polymerization initiator in a non-aqueous system.

The present invention also relates to a process for the production of the organic coating compositions mentioned above and to a process for the coil coating of steel strip.

DETAILED DISCUSSION OF THE INVENTION

Suitable olefinically unsaturated polymerizable carboxylic acids for producing the corresponding titanium, manganese or zirconium salts are any homopolymerizable and/or copolymerizable olefinically unsaturated carboxylic acids known perse, namely: acrylic acid, methacrylic acid, itaconic acid, crotonic acid, maleic acid, maleic acid semiesters, i.e. esters of maleic acid in which a carboxyl group is esterified with an alkyl group, fumaric acid or fumaric acid semiesters, reactive carboxyfunctional macromonomers or mixtures of the acids mentioned above. "Macromonomers" in the context of the present invention are understood to be oligomers or polymers containing functional terminal groups through which the polymerization reactions can take place. In principle, therefore, they are macromolecular monomers. In general, these macromonomers contain unsaturated C,C-bonds, i.e. vinyl, acryl, methacryl or styryl groups, as terminal groups.

The composition may additionally contain other copolymerizable comonomers, such as hydroxyethyl acrylate, hydroxyethyl methacrylate, hydroxypropyl acrylate, hydroxypropyl methacrylate, hydroxybutyl acrylate, hydroxybutyl methacrylate, $C_{1-8}$ alkyl acrylates or methacrylates and one or more of the olefinically unsaturated carboxylic acids mentioned above in free form, i.e. not in salt form. The hydroxyfunctional comonomers mentioned above may even be partly replaced by polyethylene glycol semiesters of the olefinically unsaturated polymerizable carboxylic acids.

In addition, the compositions according to the invention contain at least one initiator for initiating the radical polymerization. The coating is cured by thermal polymerization, photopolymerization and/or electron-beam polymerization.

Photopolymerization is particularly preferred so that the coating compositions suitable for photopolymerization contain a photoinitiator. Various commercially available photoinitiators are suitable. The compositions contain photoinitiators in quantities of 0.1 to 20% by weight, preferably in quantities of 2 to 12% by weight and more preferably in quantities of 3 to 8% by weight.

Examples of suitable photoinitiators are benzoins, benzoin alkyl ethers, benzil ketals such as, for example, benzil dimethyl ketal, acetophenone derivatives, for example dialkyl acetophenones, or even dichloro- and trichloroacetophenones. Examples of commercially available photoinitiators of the above-mentioned type are Irgacure 651 or 907 (Ciba Geigy).

In addition to or instead of the photoinitiators mentioned above, the compositions according to the invention may also contain free radical initiators of the peroxide type, for example benzyl peroxide, or azo compounds, for example 2,2'-azo-bis-isobutyronitrile. In cases where the polymerization is carried out solely as a thermal polymerization, the compositions do not of course contain a photoinitiator.

The polymerizable compositions according to the invention contain such quantities of the titanium, manganese and/or zirconium salt of the olefinically unsaturated carboxylic acid that the coating has a metal content of 0.5 to 15% and preferably 1 to 8%, up to 90% by weight of one or more of the comonomers and between 2 and 10% of the initiator.

Where alkyl acrylates and/or alkyl methacrylates are used as comonomers, the relatively long-chain alkyl compounds in particular should be present in small amounts because otherwise the compositions will not remain homogeneous in the long term. In addition, compositions such as these give poorer protection against corrosion. In general, the alkyl acrylates, for example 2-ethylhexyl acrylate in particular, should make up significantly less than 50% of the carboxyfunctional and/or hydroxyfunctional comonomers.

Polymerizable compositions of titanium, manganese or zirconium salts of acrylic or methacrylic acid with other acrylate or methacrylate comonomers are already known in principle. Thus, DE-A-2943566 describes a process for the production of an ionically crosslinked acrylic resin in which the monomer mixture contains 0.1 to 50% by weight of at least one metal salt of an unsaturated polymerizable carboxylic acid. These compositions are thermally polymerized as such. According to the document in question, the polymers obtained have an increased softening temperature and improved resistance to thermal decomposition by comparison with uncrosslinked polymers.

WO 89101952 describes a colorless transparent polymer material, preferably for optical purposes, produced by radical polymerization of a monomer mixture which contains from 20 to 40% by weight of a zirconium (IV)/acrylate compound.

EP-A-518609 describes a surface-textured film which is applied to a polymeric substrate and which consists of a hardened coating. Comonomer compositions which contain inter alia metal acrylates (zine diacrylate is mentioned in particular) and which are photopolymerized are proposed for these solvent-containing coatings.

None of the documents cited above discloses polymerizable compositions for the organic coil coating of metallic materials of the type according to the invention.

The compositions according to the invention may also contain additional additives, for example lubricants, in order to facilitate the subsequent forming of the correspondingly coated steel materials. However, it is a crucial requirement in this regard that the additives in question should not affect the crosslinking of the monomers.

The polymerizable organic medium is so polar that the salt-form metal components are able to react on the steel surface. It is assumed that this reaction of the titanium, manganese and/or zirconium salts on the steel surface or on the galvanized steel surface is responsible for corrosion control. Accordingly, it is all the more important that the compositions according to the invention enable a very large amount of corrosion-inhibiting metal to be introduced with little ballast, i.e. components which do not make any contribution towards corrosion control. At the same time, the metal complexing agent together with the metal becomes the binder component of the coating of the steel surface.

The compositions according to the invention may be produced in two different ways. Either the titanium, manganese and/or zirconium salts of the olefinically unsaturated polymerizable carboxylic acid are produced in a separate step and then dissolved in the remaining comonomers, followed by addition of the initiator(s).

In one particularly preferred process, the titanium, manganese and/or zirconium salts of the unsaturated carboxylic acid are produced in situ, i.e. the corresponding carboxylic acids are initially introduced and the corresponding metal oxides, metal hydroxides, metal alcoholates, metal carbonates and/or β-dicarbonyl compounds of the metals are dissolved in the optionally heated carboxylic acid(s). The alcohols or β-dicarbonyl compounds released may optionally be removed from the composition by distillation, optionally in vacuo. However, they may also remain in the composition.

Although the compositions according to the invention are substantially free from organic solvents, this does not mean that small quantities of alcohols, β-dicarbonyl compounds or other volatile organic constituents from the production process cannot be present in small quantities in the composition.

The compositions according to the invention are normally applied to the steel plate in a sufficient quantity to obtain layer thicknesses of 0.5 to 10 μm and preferably 1 to 3 μm.

The following Examples are intended to illustrate the invention. All quantities relating to the compositions are expressed in % by weight, unless otherwise stated.

A) PRODUCTION OF THE POLYMERIZABLE COATING MIXTURES

EXAMPLE 1

14.3 g of titanium isopropyl orthotitanate in isopropanol, 14.5 g of acrylic acid and 66.9 g of hydroxyethyl acrylate are mixed at room temperature to form a homogeneous coating composition.

EXAMPLE 2

40.9 g of maleic anhydride suspended in 48.5 g of hydroxyethyl acrylate are heated to 90° C. and stirred at that temperature for 1 hour. 16.3 g of titanium isopropyl orthotitanate are then added dropwise over a period of 10 minutes. 5.7 g of isopropanol released are then distilled off in vacuo at about 50 mbar.

EXAMPLE 3

37.6 g of maleic anhydride suspended in 44.7 g of hydroxyethyl acrylate are heated to 90° C. and stirred at that temperature for 1 hour. 27.3 g of titanium isopropyl orthotitanate are then added dropwise over a period of 10 minutes. 9.6 g of isopropanol released are then distilled off in vacuo at about 50 mbar.

EXAMPLE 4

23.6 g of maleic anhydride suspended in 70.1 g of hydroxyethyl acrylate are heated to 60° C. and stirred at that temperature for 1 hour. 17.1 g of titanium isopropyl orthotitanate are then added dropwise over a period of 10 minutes. 10.8 g of isopropanol released are then distilled off in vacuo at about 100 mbar.

EXAMPLE 5

19.6 g of maleic anhydride suspended in 46.8 g of hydroxypropyl methacrylate are heated to 60° C. and stirred at that temperature for 1 hour. 12.0 g of pentaerythritol triacrylate are added to the resulting mixture. After cooling to below 35° C., 23.4 g of a 70% solution of zirconium isopropyl orthotitanate in isopropanol are added dropwise over a period of 10 minutes. The mixture is homogenized by stirring and immediately applied.

B) APPLICATION AND CURING

Before coating, quantities of 5% by weight of benzyl dimethyl ketal, based on the binder content, are added as photoinitiator to the mixtures to be polymerized and homogenized therein by stirring.

The coating compositions are applied by paint thrower to the plate to be coated for 10 seconds at 500–1000 r.p.m. (depending on viscosity) in a layer thickness of 1 to 2 $\mu$m and then exposed for 3 minutes to an Ultra Jet 100 UV lamp with an output of 100 watts per centimeter of length. The coated plate is then salt-spray-tested for 24 hours in accordance with DIN 5002155. Result:

No corrosion is observed either on electrolytically galvanized steel plate or on hot-dip-galvanized steel plate ("Galvalume", "Galfan"). Formulations with no metal salt added show large patches of white rust or blackening after this period.

Accordingly, the anti-corrosive coating matches the performance of chromium-containing systems.

What is claimed is:

1. A polymerizable composition for forming an organic coating on a metallic material comprising
    (a) at least one salt of an olefinically unsaturated polymerizable carboxylic acid, said salt being selected from the group consisting of titanium salts, manganese salts, zirconium salts and mixtures thereof; and
    (b) at least one radical polymerization initiator wherein the at least one radical polymerization initiator comprises an initiator activatable by radiation.

2. The polymerizable composition of claim 1 additionally comprising at least one olefinically unsaturated comonomer other than (a).

3. The polymerizable composition of claim 1 wherein the olefinically unsaturated carboxylic acid is selected from the group consisting of acrylic acid, methacrylic acid, itaconic acid, crotonic acid, maleic acid, maleic acid semiesters, fumaric acid, fumaric acid semiesters, reactive carboxyfunctional macromonomers and mixtures thereof.

4. The polymerizable composition of claim 1 additionally comprising at least one olefinically unsaturated comonomer selected from the group consisting of hydroxyethyl (meth) acrylate, hydroxypropyl (meth)acrylate, hydroxybutyl (meth)acrylate, $C_1$–$C_8$ alkyl (meth) acrylates, acrylic acid, methacrylic acid, itaconic acid, crotonic acid, maleic acid, maleic acid semiesters, fumaric acid, fumaric acid semiesters, reactive carboxyfunctional macromonomers, and mixtures thereof.

5. The polymerizable composition of claim 1 having a metal content of 0.5 to 15% by weight.

6. A process for producing the polymerizable composition of claim 2 comprising mixing together by stirring the at least one salt of an olefinically unsaturated polymerizable carboxylic acid and the at least one other olefinically unsaturated comonomer until a homogeneous mixture is obtained and subsequently combining the at least one radical polymerization initiator with said homogeneous mixture.

7. A process for producing the polymerizable composition of claim 1 comprising producing the at least one salt of an olefinically unsaturated polymerizable carboxylic acid in situ by reacting the olefinically unsaturated polymerizable carboxylic acid with at least one compound selected from the group consisting of titanium oxides, manganese oxides, zirconium oxides, titanium hydroxides, manganese hydroxides, zirconium hydroxides, titanium alcoholates, manganese alcoholates, zirconium alcoholates, titanium carbonates, manganese carbonates, zirconium carbonates, titanium β-dicarbonyl compounds, manganese β-dicarbonyl compounds, zirconium β-dicarbonyl compounds and mixtures thereof.

8. A process for coating a surface of a metallic material comprising forming a coating of a polymerizable composition comprising
    (a) at least one salt of an olefinically unsaturated polymerizable carboxylic acid, said salt being selected from the group consisting of titanium salts, manganese salts, zirconium salts and mixtures thereof; and
    (b) at least one radical polymerization initiator; on said surface and curing said coating.

9. The process of claim 8 wherein said curing is accomplished by a method selected from the group consisting of thermal polymerization, photopolymerization, electron beam polymerization and combinations thereof.

10. The process of claim 8 wherein said coating has a layer thickness of 0.1 to 10 $\mu$m.

11. The process of claim 8 wherein said coating has a layer thickness of 0.5 to 5 $\mu$m.

12. The process of claim 8 wherein said metallic material is a steel strip.

13. The process of claim 8 wherein the surface of the metallic material is cleaned and degreased prior to forming said coating on the surface of the metallic material.

14. A process for coating a surface of a metallic material selected from the group consisting of electrolytically galvanized steel strip and hot-dip galvanized steel strip comprising
    (a) cleaning and degreasing said surface;
    (b) rinsing said surface;
    (c) forming a coating having a layer thickness of 0.1 to 10 $\mu$m of a polymerizable composition comprising:
        (a) at least one salt of an olefinically unsaturated polymerizable carboxylic acid, said salt being selected from the group consisting of titanium salts, manganese salts, zirconium salts and mixtures thereof; and
        (b) at least one radical polymerization initiator on said surface; and
        (c) curing said coating by a method selected from the group consisting of thermal polymerization, photopolymerization, electron beam polymerization and combinations thereof.

15. A coated metallic material comprising a metallic material having coated thereon a layer of the polymerizable composition comprising:
  (a) at least one salt of an olefinically unsaturated polymerizable carboxylic acid, said salt being selected from the group consisting of titanium salts, manganese salts, zirconium salts and mixtures thereof; and
  (b) at least one radical polymerization initiator in cured form.

16. The coated metallic material of claim 15 wherein the metallic material is steel.

17. The polymerizable composition of claim 6 containing up to 90% by weight of one or more comonomers and between 2 and 10% by weight of the initiator.

18. The composition of claim 17 having a metal content of 1 to 8% by weight.

* * * * *

UNITED STATES PATENT AND TRADEMARK OFFICE
CERTIFICATE OF CORRECTION

PATENT NO. : 6,365,234 B1
DATED : April 2, 2002
INVENTOR(S) : Schieferstein et al.

It is certified that error appears in the above-identified patent and that said Letters Patent is hereby corrected as shown below:

<u>Column 3,</u>
Line 50, delete "WO 89101952"; and insert therefore -- WO 89/01952. --

Signed and Sealed this

Fifth Day of November, 2002

*Attest:*

*Attesting Officer*

JAMES E. ROGAN
*Director of the United States Patent and Trademark Office*